United States Patent
Pesar

(10) Patent No.: US 7,525,676 B2
(45) Date of Patent: Apr. 28, 2009

(54) SYSTEM AND METHOD FOR CONTROLLING ACCESS TO PROGRAMMING OPTIONS OF A MULTIFUNCTION DEVICE

(75) Inventor: Robert J. Pesar, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 786 days.

(21) Appl. No.: 11/110,538

(22) Filed: Apr. 20, 2005

(65) Prior Publication Data

US 2006/0238789 A1    Oct. 26, 2006

(51) Int. Cl.
*G06F 3/12* (2006.01)
*G06K 15/00* (2006.01)

(52) U.S. Cl. .................................. 358/1.13; 358/1.14
(58) Field of Classification Search ............. 358/1.1, 358/1.9, 1.13, 1.15, 400, 448, 474, 1.14; 709/201, 213
See application file for complete search history.

(56) References Cited

U.S. PATENT DOCUMENTS

| | | | | |
|---|---|---|---|---|
| 5,694,222 | A | 12/1997 | Yamada | 358/296 |
| 6,266,693 | B1 | 7/2001 | Onaga | 709/219 |
| 6,498,912 | B1 | 12/2002 | Leni et al. | 399/79 |
| 6,535,297 | B1 | 3/2003 | Steele et al. | 358/1.15 |
| 6,678,068 | B1 | 1/2004 | Richter et al. | 358/1.15 |
| 6,694,115 | B2 | 2/2004 | Weaver | 399/80 |
| 6,748,183 | B2 | 6/2004 | Edmonds | 399/23 |
| 6,762,771 | B1 | 7/2004 | Niki et al. | 715/700 |
| 6,973,671 | B1 * | 12/2005 | Hsing et al. | 726/8 |
| 2002/0095586 | A1 * | 7/2002 | Doyle et al. | 713/186 |
| 2004/0042027 | A1 * | 3/2004 | Timperman et al. | 358/1.13 |
| 2005/0134905 | A1 * | 6/2005 | Horiyama | 358/1.15 |
| 2006/0065720 | A1 * | 3/2006 | Asako et al. | 235/382 |
| 2007/0107042 | A1 * | 5/2007 | Corona | 726/2 |

* cited by examiner

*Primary Examiner*—Gabriel I Garcia
(74) *Attorney, Agent, or Firm*—Maginot, Moore & Beck LLP

(57) ABSTRACT

A system for enabling client devices to access different sets of features on a multifunction device to which the devices are coupled includes a multifunction device having an input device for receiving constraint data that identifies a subset of multifunction features available on the multifunction device for at least one client device in a plurality of client devices coupled to the multifunction device; and a memory for storing the constraint data in association with the one client device. Each client device includes a multifunction device driver that is configured to generate a print job for the multifunction device in accordance with the constraint data corresponding to the client device that was received from the multifunction device. Thus, the driver at each client device generates print jobs that utilize the features identified by the constraint data received at the client device.

18 Claims, 4 Drawing Sheets

SYSTEM AND METHOD FOR CONTROLLING ACCESS TO PROGRAMMING OPTIONS OF A MULTIFUNCTION DEVICE

TECHNICAL FIELD

The present invention generally relates to methods and apparatus for processing print jobs. In particular, the invention relates to systems and methods for processing print jobs with a multifunction device.

BACKGROUND

Client devices, such as personal computers, are widely used to generate complex print processing jobs containing text, graphics and images using software application programs such as word processing and desktop publishing. Multi-function devices (MFD's), such as printers and copiers, provide users with the ability to output these print processing jobs utilizing a wide variety of features such as print speed, print quality, paper size, paper source (auto, upper, lower, manual), copy count, orientation (landscape or portrait), color, grayscale, stapling, duplexing, sorting, and others.

In order for a client device to send a print processing job to a MFD, whether the MFD is connected directly to the client device or connected to a network, an MFD driver is typically installed on the client device. The MFD driver performs a number of basic functions such as: 1) compiling a print processing job using the job processing commands of the MFD; and 2) communicating the print processing job and status information between the client device and the MFD. Compilation of the print processing job includes enabling the user to program specific features of the MFD, such as media tray selection, duplexing options, print parameters, and the like.

In previously known MFD systems, once an application program has generated a file for print job processing, the application program issues a job processing request to the operating system on the client device. The processing request contains information identifying the file to be processed and the type of processing requested. The operating system passes the job data parameters to the MFD driver. The MFD driver formats the job according to the capabilities and features of the particular MFD and transfers the formatted job to the MFD for processing. The MFD driver may also display job processing options and accept user selections through a graphical user interface (GUI). Once settings are confirmed and/or selected, the MFD driver formats the print processing job in accordance with the selected options and then transfers the formatted job to the MFD for processing.

In a network environment, multiple client devices may be able to access one or more MFDs coupled to the network. In this situation, a MFD driver for each MFD is typically installed on each client device to provide all of the client devices with equal access to the same capabilities and features of the MFD. In some environments, equal access to all features of a MFD may present resource issues. For instance, in some environments such as legal, educational, or business environments, allowing all users to print color documents on an MFD is both impractical and uneconomical. Color toners and ink are more expensive than black ink and color jobs require more time to process than black and white jobs. In another example, MFDs often have multiple trays containing various media, such as different size or quality paper, transparencies, card stock, etc. Obviously, some types of media, such as high quality paper, can be very expensive, and allowing all users access to high quality paper can become costly.

One method for addressing this issue is to couple more than one MFD to a computer network and install only one MFD driver on each client device. If one MFD has a tray with high quality paper and the other one does not, the client devices having the MFD driver for the MFD without the high quality paper cannot access the MFD having the more expensive resource. This approach, however, is more expensive to implement because it requires multiple MFDs and each MFD must be configured differently. For example, a separate MFD driver that can control the color printing feature of an MFD is provided for client devices that are authorized to print color documents, while a second version of the driver is installed in client devices authorized to print black and white documents only. Alternatively, each client device may be configured to only recognize one MFD or the other. This requires a system administrator to configure the client devices individually and maintain data regarding the appropriate configuration for a client device. Savvy users, however, may attempt to overcome this restriction by reprogramming the control panel setup on the client device to recognize multiple MFDs on the network. Thus, this approach may not effectively preclude the user from accessing MFDs with capabilities not required for the user's work.

What is needed is a way of restricting client device access to MFD resources over a computer network without requiring multiple MFDs with different capabilities to be coupled to the network.

What is needed is a way of restricting client device access to MFD resources over a computer network without requiring the system administrator to configure each client device at the client device on the network.

SUMMARY

A system that selectively restricts access of a client device to the features of a multifunction device addresses the limitations of previous approaches for conserving MFD resource utilization by a plurality of client devices. The system includes a multifunction device having (i) an input device for receiving constraint data that identifies a group of multifunction features available on the multifunction device for at least one client device in a plurality of client devices coupled to the multifunction device, and (ii) a memory for storing the constraint data in association with the one client device. The client device in the system has a multifunction device driver that is configured to generate a print processing job for the multifunction device in accordance with the constraint data received from the multifunction device.

The system may be used to store multiple sets of constraint data in the multifunction device and associate each client device in the plurality of client devices with a set of constraint data. Each print job processing request received from a client device includes a client device identifier. The multifunction device uses the client device identifier to retrieve a set of constraint data corresponding to the requesting client device and returns the retrieved set of constraint data to the requesting client device. The MFD driver at the client device uses the returned set of constraint data to restrict the features that may be used to generate a print job. The available features may be displayed through a user interface at the client device. Once the print job is generated in accordance with the constraint data received from the MFD, the print job may be communicated to the MFD for processing.

The constraint data may be entered in the MFD through an input device. The input device may be a user interface. An authorized person, such as a system administrator, may enter the constraint data identifying the MFD features accessible by a client device and an identifier for the client device. Alternatively or additionally, the MFD may accept constraint data and client device identifiers through a communication interface, such as a network communication card. These data may be received from a system administration computer or portable device for programming constraint data in a MFD.

In an alternative embodiment, the MFD receives a client device identifier that is used to retrieve constraint data associated with the client device that sent the client device identifier. A print job received from the client device is processed in accordance with the retrieved constraint data. If the print job requests MFD resources not authorized by the constraint data for the client device, the print job is processed with the most equivalent alternative resource, if one exists. A message indicated the print job has been processed also informs the user of the client device of the resource substitution or denial that occurred during processing of the print job.

A method of operating a system to restrict access to features of a MFD includes receiving constraint data at a multifunction device, the constraint data identifying a group of multifunction features available on the MFD for at least one client device in a plurality of client devices; storing the constraint data in the multifunction device in association with the one client device in the plurality of client devices; and generating a print processing job at the client device associated with the constraint data, the print processing job being generated in accordance with the constraint data.

A multifunction device may be constructed to enable the selective restriction of client devices to the features of a MFD for processing print jobs. Such a MFD includes storage for multiple sets of constraint data, each set of constraint data identifying a group of multifunction device features that differs from a group of multifunction device features identified by another set of constraint data and a print job processor for sending a set of constraint data to a client device in response to a print job request received from the client device, the selected set of constraint data corresponding to the client device sending the print job request. To provide constraint data to the MFD, the MFD may also include an input device for receiving a set of constraint data that identifies a subset of multifunction features available on the multifunction device. The multifunction device stores the set of constraint data in association with at least one client device in a plurality of client devices coupled to the multifunction device. The input device may be a user interface for receiving a client device identifier and a set of constraint data to be associated with the client device identifier or a communication interface for receiving constraint data messages from a system administration computer coupled to the multifunction device. The constraint data messages include a set of constraint data for a client device and a client device identifier to be associated with the set of constraint data.

The system and MFD, described in more detail below, enable access to features of an MFD for processing print jobs to be selectively controlled by the MFD. This selective control may be installed in the MFD by a system administrator, either at the MFD or remotely from a system administration computer.

Other benefits and advantages of the MFD and a system incorporating the MFD will become apparent upon reading and understanding the following drawings and specification.

DETAILED DESCRIPTION

Figure 1:
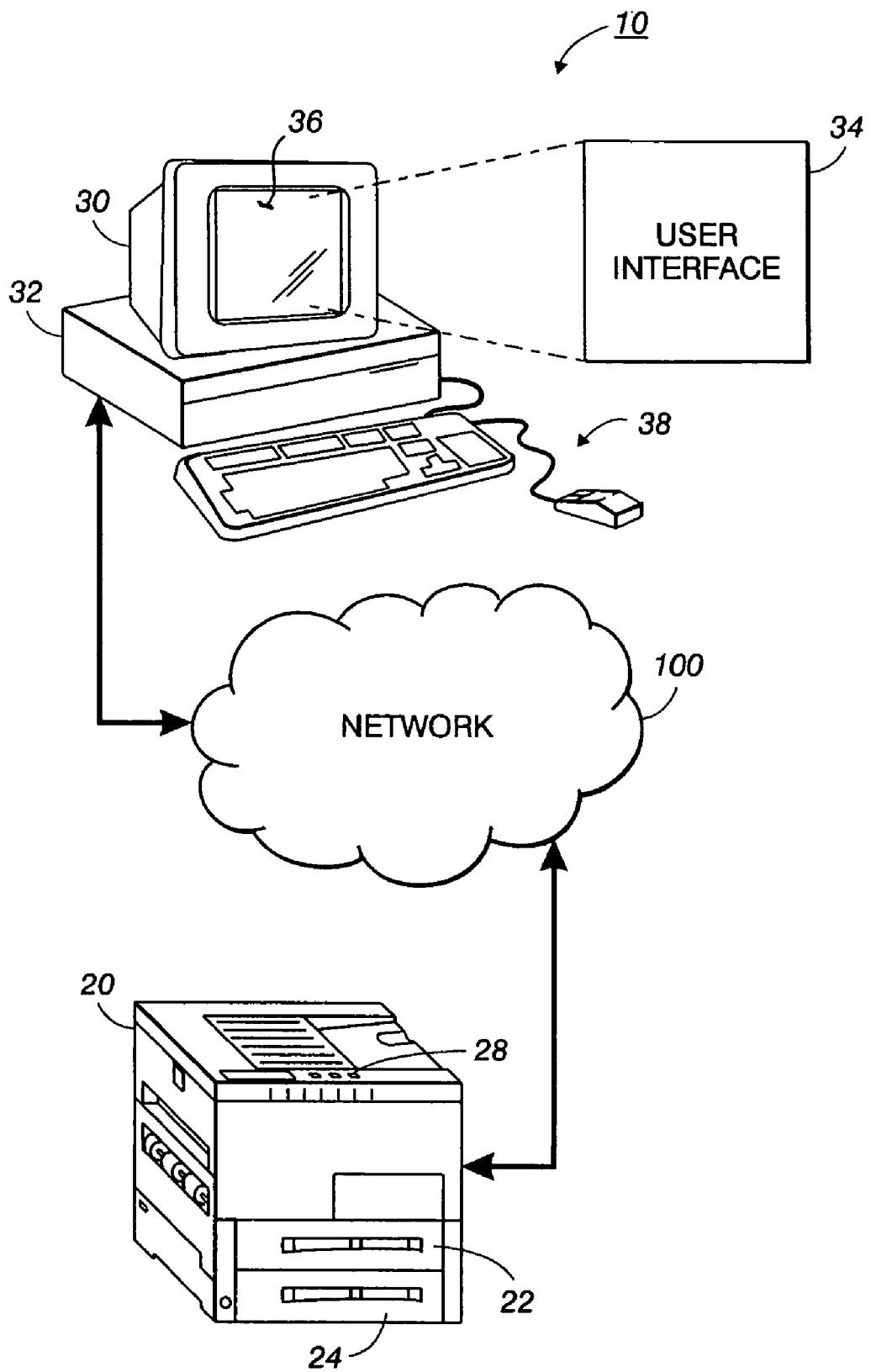
FIG. 1 is an elevational schematic of a system that may be modified to control access to programming options of a MFD.

In the drawings, like reference numerals have been used throughout to designate like elements. Referring to FIG. 1, system 10 includes a multifunction device (MFD) 20, such as a printer, that is coupled to a client device 30 through a network 100. Network 100 may employ any network topology, transmission medium, or network protocol. The network 100 may be connected using wire, fiber, or wireless channels, as known in the art. MFD 20 may include trays 22 and 24 for holding media and a user interface 28, such as a panel menu. The panel menu may be used to select features and enter other data in the MFD 20. Such interfaces are well known and may include touch screens having touch activated keys for navigating through an option menu or the like.

Client device 30, which may be a personal computer, includes a display 36. Client device 30 and printer 20 are shown as being coupled to one another through a computer network 100. They may, however, be directly coupled to each other. For example, the MFD 20 may be coupled to the client device 30 through a parallel port or USB port of client device 30. A MFD driver program 32 has been installed on client device 30 and resides on the host device's hard drive. The MFD driver program may be activated through an application interface so that a user may generate a print job with the MFD driver 32 for processing by the MFD 20. The MFD driver 32 includes a print job processor for generating print jobs and submitting them to the MFD 20 from the host device 30. The MFD driver 32 also includes a user interface 34, such as a graphical user interface (GUI) for communicating MFD features for processing a print job to a user and accepting the user's selection of available MFD features. The user interface displays information and receives data through device display 36 and/or the keyboard/mouse combination 38.

When a user wants to send a print job to MFD 20 for processing, the user opens the MFD driver user interface 34. The MFD driver 32 sends a printer configuration request to the MFD 20 and the MFD 20 responds with information regarding the type and model, for example, of the MFD. The MFD user interface 34 displays this information so the user may select from the various features to generate the print job to be processed by the MFD 20. The information displayed may also include data regarding the status of resources at the MFD 20, such as whether media sheets are in the trays at the MFD 20.

In the prior art MFDs, information can be obtained from the MFD 20 and displayed in the MFD driver user interface 34. For example, many printers provide the following information: options installed on the printer, tray count, media type (for each tray), media size (for each tray), status (for each tray) and name (for each tray). Additionally, if the printer is configured to monitor ink or toner consumables (for each container, for example, color, quantity or level, and name may be available) that information can be obtained and displayed in the printer driver user interface. If the MFD 20 is directly coupled to the client device 30, the MFD driver 32 can easily obtain this information from the printer through the parallel port or USB port. If the MFD 20 is located on a network, the MFD driver 32 can obtain data about the MFD via a socket communication session over the network. Once the data are obtained, the MFD driver displays the data in the MFD driver user interface. In the prior art devices, the MFD provides data about the MFD indiscriminately, that is, all client devices coupled to the MFD, directly or through a network, are able to obtain the same data regarding the MFD. As a consequence, all of the devices are able to use all of the resources and features available at the MFD.

Figure 2:
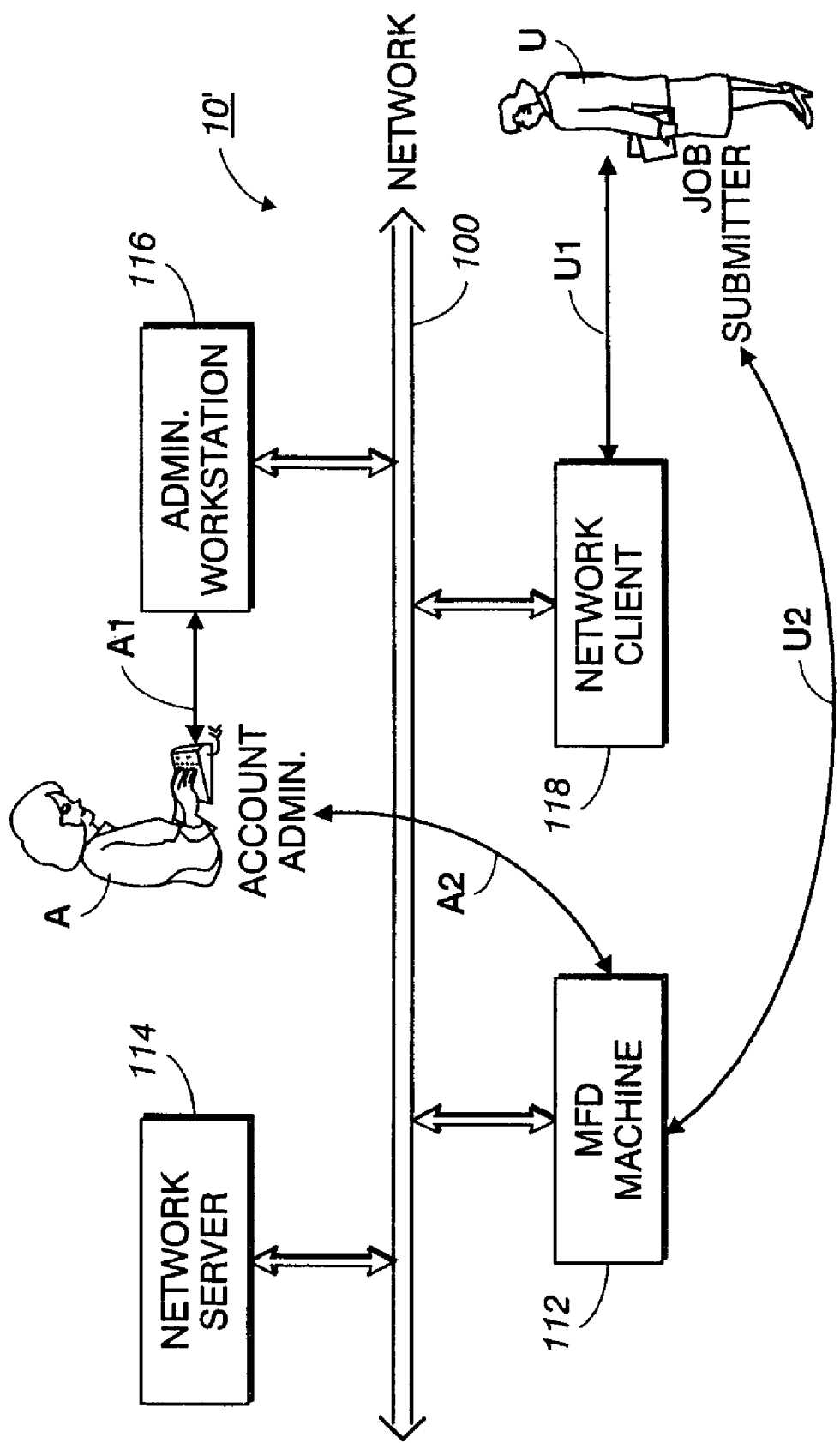
FIG. 2 is an elevational schematic of a system coupled through a network that enables access to programming options of a MFD by client devices to be controlled by the MFD.

One embodiment of a system 10' that may be used to discriminate between client devices so that different groups of MFD features are made available to different client devices is shown in FIG. 2. The network 100 is supported by a network server 114. A print job submitter U interacts with the user interface 34 of a network client device 118 to submit a print job over the network 100 to the MFD 112 for processing. A system administrator A interacts with an administration workstation 116 to establish constraint data, discussed in more detail below, and associate them with a client device 118 on the network 100. Although only one client device 118 is shown in FIG. 2, multiple client devices may be coupled to the MFD 112 through the network 100. Only one client device is shown in FIG. 2 to simplify the discussion.

The constraint data and associated identifier for a client device may be communicated from the administration workstation 116 to the MFD 112 over the network or the system administrator may record the constraint data and client device association and enter them in the MFD 112 as indicated by the arrow A2. The recording of the constraint data and client device association may be manually entered through the user interface of the MFD 112 or uploaded from the administration workstation 116 to a portable device. The constraint data and client device association may be communicated to the MFD at the MFD through a wired or wireless communication interface. For example, the constraint data and client device association may be stored in a PDA and communicated through an infrared communication port at the MFD 112. In another example, the constraint data and client device association may be stored in a USB memory fob and downloaded into the MFD 112 by coupling the memory fob with a USB port at the MFD.

To support the ability of the system 10' to discriminate from among the client devices in a plurality of client devices coupled to the network 100 so the processing of print jobs may be restricted to a first group of MFD features at one client device and restricted to a second group of MFD features at another client device, the user interface 28 of the MFD 20 may be modified to provide an input device for receiving constraint data. The constraint data identifies a group of multifunction features available on the MFD 20 that are associated with at least one client device in a plurality of client devices coupled to the MFD 20 through the network 100. The MFD 20 also includes a memory for storing the constraint data. The MFD driver 32 of the client device 30 is configured to generate a print job for the MFD 20 in accordance with the constraint data received from the MFD 20.

As used herein, the multifunction device (MFD) 20 refers to any device(s) that is capable of, among other things, copying documents, printing computer-generated documents, scanning documents, or faxing documents. The input device of the MFD 20 includes may be a local user interface, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

Constraint data may also be entered in the MFD 20 over the network 100. For example, a system administrator may store constraint data in a system administration workstation for multiple client devices and multiple MFDs that are coupled to the network 100. The system administration computer may be a personal computer, workstation, or a server that is coupled directly to the network 100 or selectively coupled to the MFD 20.

The constraint data are stored in a memory within the MFD 20. Suitable memory may include any combination of volatile memory elements, e.g., RAM, DRAM, SRAM, or the like, and/or nonvolatile memory elements, e.g., ROM, hard drive, tape, CDROM, or the like. Other memory that may be used to store constraint data in a MFD 20 may include electronic, magnetic, optical, and/or other types of storage media. The constraint data received through an input device for the MFD 20 are stored in the memory in association with one of the client devices coupled to the MFD 20. If no constraint data are stored for a client device coupled to the MFD, then the client devices does not have any constraints on the MFD resources that may be used for the generation of print jobs at the client device 30. Additionally, more than one client device may be associated with a set of constraint data so that less than all of the client devices coupled to the MFD, but more than one client device may be subject to the same resource constraints.

The memory of the MFD 20 may store multiple sets of constraint data, each of which may be associated with at least one and possibly more than one client device. In this configuration, the print job processor of the MFD 20 receives a printer configuration request that contains a client device identifier. The client device identifier is used to retrieve the corresponding set of constraint data for the client device that sent the printer configuration request. The retrieved constraint data may be displayed on the user interface display 36 at the client device 30 and the client device driver 32 generates print jobs in accordance with the constraint data received from the MFD 20.

The constraint data may identify MFD features or programming options, such as print speed, print quality, paper size, paper source (auto, upper, lower, manual), copy count, orientation (landscape or portrait), color, grayscale, stapling, duplex operation, sorting, or the like. More particularly, a set of constraint data stored in MFD 20 may identify the programming options or features that the MFD driver 32 installed on a client device 30 may use in generating a print job at the client device 30 for processing at the MFD 20. A list of all the client devices coupled to an MFD and a group of corresponding programming options for each client device 30 may be stored in the memory of the MFD 20. For a group of programming options to be different than another group of programming options, the two groups need only differ by a single option or the addition or absence of a single option. While each client device may have a corresponding set of constraint data that is unique that the constraint data sets for the other client devices coupled to the same MFD, multiple client devices may correspond to the same set of constraint data.

A set of constraint data may be compiled by a system administrator, office manager, or some other person in a similar position. A constraint data set is associated with at least one client device. Multiple constraint data sets may be compiled and each data set associated with one or more client devices. Constraint data messages may be communicated with an MFD over a network or the input device for a MFD. In this manner, a MFD is provided with the ability to differentiate between the client devices coupled to it and restrict the MFD features available to each of the client devices coupled to it. The constraint data may be provided in an electronic format can be stored on any form of computer readable medium that the memory in the MFD 20 may take.

The client devices 30 are identified with a client device identifier. The constraint data stored in the MFD 20 are associated with one or more client device identifiers for the client devices coupled to the MFD. The client device identifiers may take many different forms as long as they uniquely identify a client device or a group of client devices corresponding to a set of constraint data. For example, a client device may be a unique device identifier, such as an IP address.

In another embodiment, the client identifier may also be a password key. The password key may be defined by a system administrator and provided to users of client devices coupled to a MFD 20. The system administrator also associates a password key with a set of constraint data stored in the memory of a MFD 20. A unique password key may be provided for each client device coupled to a MFD 20 or a password key may be provided for a group of client devices coupled to a MFD so all the devices in the group have access to the same MFD features. In this embodiment of the system 10', the password key is sent along with a print job request to the MFD 20 by the MFD driver 32. The print job processor in the MFD 20 first determines whether the password key corresponds to any password key stored in the memory of the MFD 20. If no corresponding password key is stored in the MFD 20, then the print job processor determines that the client device is not authorized to have print jobs processed by the MFD. If the password key is stored in the memory of the MFD, then the corresponding constraint data set is retrieved and returned to the requesting client device. The returned constraint data set is used by the MFD driver 32 to generate a print job that is sent to the MFD 20 for processing.

In an alternative embodiment, the MFD 20 receives a client device identifier, such as an IP address or password key, that is used by the MFD 20 to retrieve constraint data associated with the client device that sent the client device identifier. A print job received from the client device is processed in accordance with the retrieved constraint data. If the print job requests MFD resources not authorized by the constraint data for the client device, the print job is processed by the MFD 20 with the most equivalent alternative resource, if one exists. A message indicated the print job has been processed also informs the user of the client device of the resource substitution or denial that occurred during processing of the print job.

Figure 3:
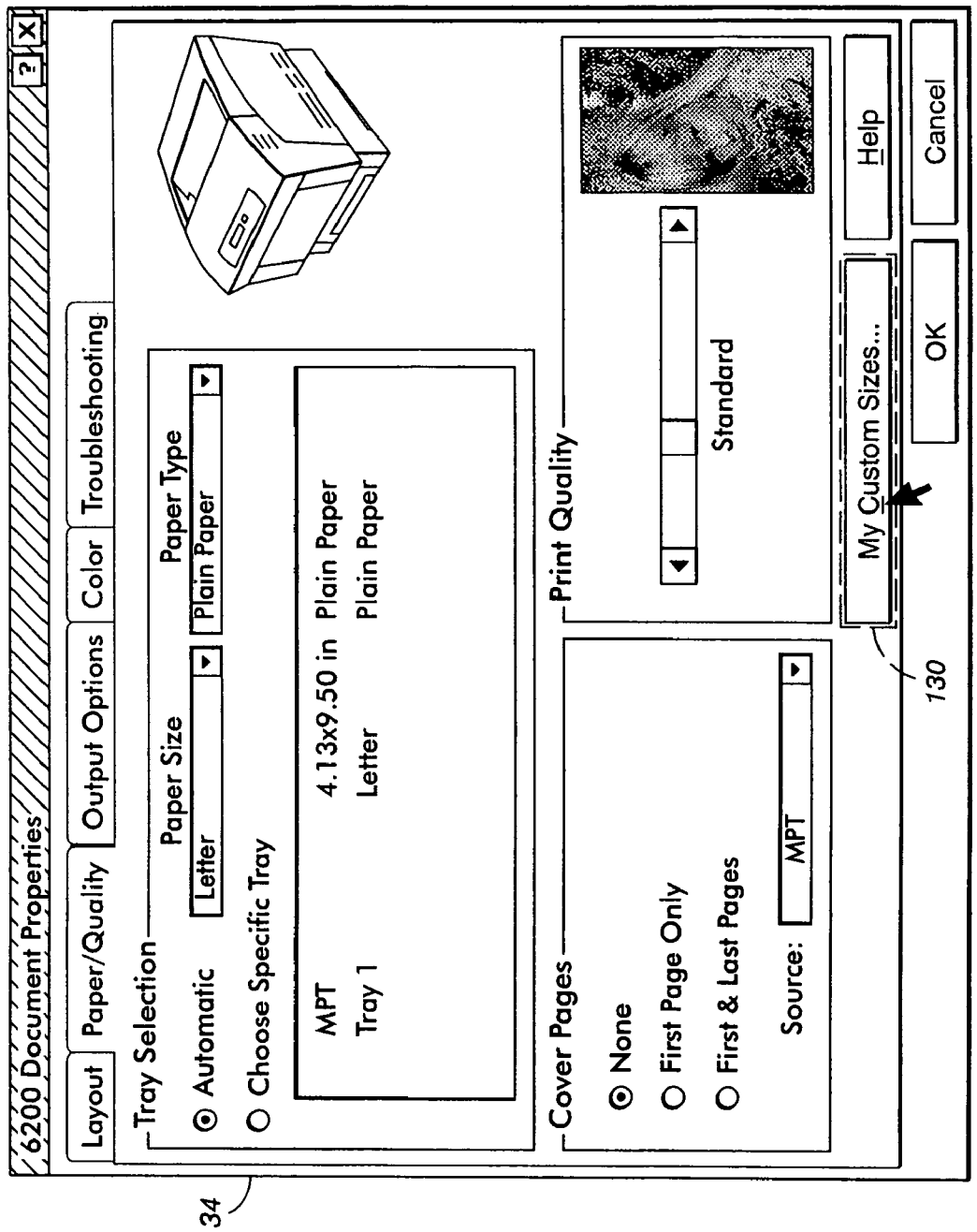
FIG. 3 is an exemplary display of programming options for a MFD that is generated by a MFD driver at a client device.

An exemplary user interface 34 that may be generated by a MFD driver 32 in client device 30 is shown in FIG. 3. When a user wants to send a print job to the MFD 20, the user opens the MFD driver user interface 32. The MFD driver 32 generates a printer configuration request that is sent to a MFD. The user interface 34 is configured to display the available features and programming options, such as media trays, the type of media in each tray, the size of media in the trays, colors of ink or toner, and the like. If no constraint data set is returned from the MFD 20 to the client device 30, then the user interface 34 is enabled to display all of the features and programming options for the model and type of MFD 20 to which it is coupled. Otherwise, the user interface displays only the features and programming options corresponding to the constraint data set returned to the client device. The user interface 34 may be used to obtain the print job parameters for a print job so the MFD driver is able to generate the print job and send it to the MFD for processing.

In one embodiment, the user interface 34 is configured to completely eliminate features and/or options from the display that are not enabled in the constraint data set. Alternatively, the user interface 34 may display all of the features and/or options for the MFD to which it is coupled, but disables the ability of the user to select the features or options not identified in the constraint data set returned to the client device. For example, features or options not identified in the constraint data may be grayed out in the user interface 34 depicted in the display 36 so that the user sees the feature or option and knows that it is not available for selection by a user. The dashed lines for the Custom Size button 130 in FIG. 3 represent a graphical depiction of a feature that indicates the feature, though supported by the MFD 20, is not available to the user at the client device.

Figure 4:
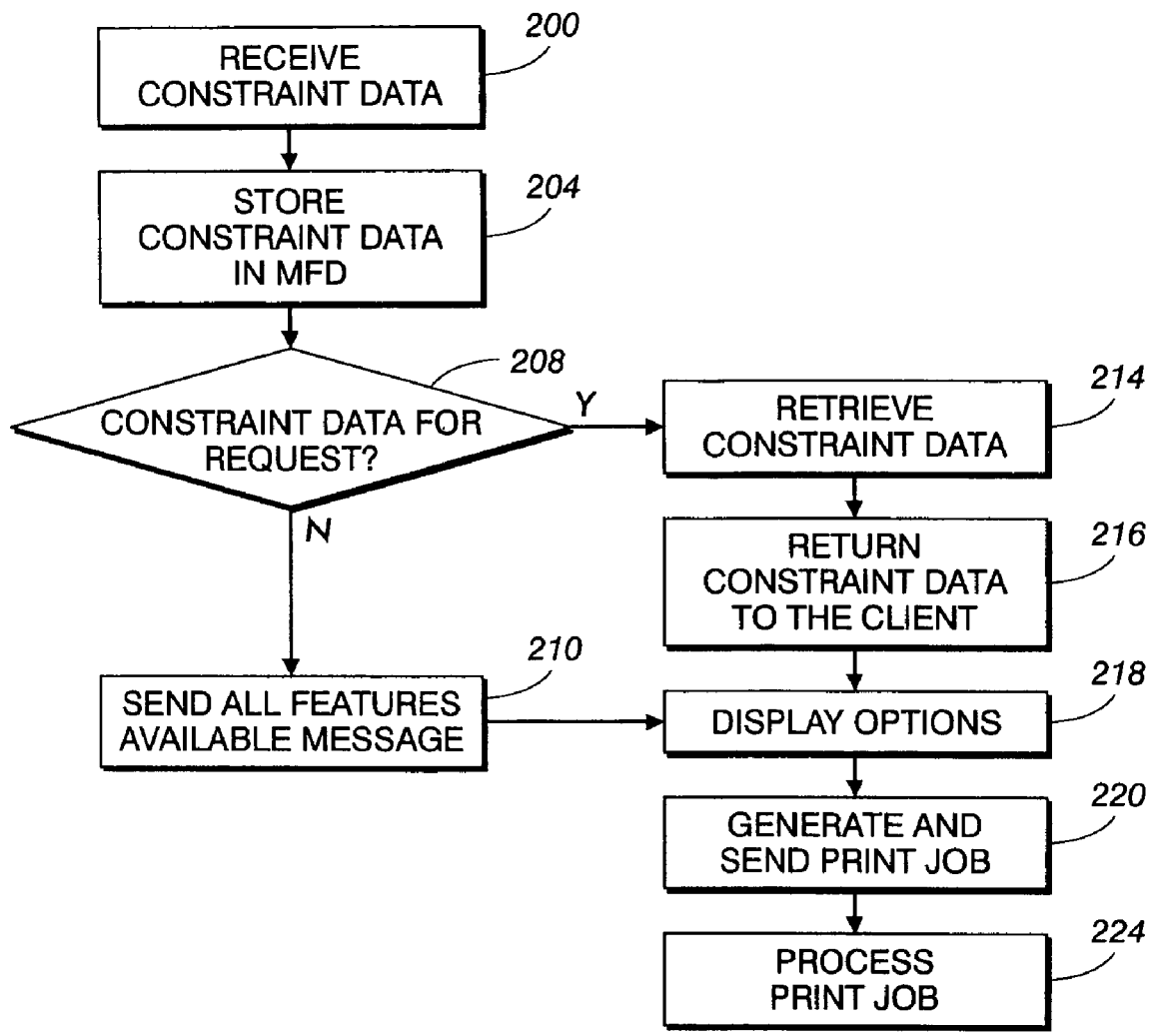
FIG. 4 is a flow diagram of an exemplary process for controlling client device access to the features of a MFD.

To operate a system so that a MFD is able to discriminate among the plurality of client devices coupled to the MFD, the exemplary method shown in FIG. 4 may be performed. For each MFD coupled to a plurality of client devices, constraint data is received at the MFD (block 200). The entry of the constraint data may be through a user interface at the MFD, a communication interface at the MFD, or through a communication interface for data messages from a system administration computer. The constraint data are then stored in the MFD in association with at least one client device (block 204). The association with the client device may be accomplished by using a client device identifier, such as an IP address or password key as previously described. Upon receipt of a printer configuration request from a client device, the process determines whether a set of constraint data exists for the client device that sent the printer configuration request (block 208). In the embodiment in which the client device is identified with a password key, the absence of the password key in the memory of the MFD indicates the client device is not authorized to use the MFD to process jobs. The MFD may respond by not sending any data message or by sending an error message indicating the device is not authorized to access the MFD. In an embodiment in which the client device is identified with an IP address, the lack of an association of the IP address with a set of constraint data may be used to indicate to the MFD that the client device may access all of the features of the MFD. In that case, a message is returned to the client device that sent the request indicating all the features of the MFD are available to process a job (block 210). Otherwise, the set of constraint data associated with the client device identifier are retrieved (block 214) and returned to the client device (block 216). The MFD driver at the client device displays the options that are available for processing of a print job in accordance with the set of constraint data received from the MFD (block 218). After the user has selected from the available options for the job, the MFD driver generates a print job (block 220) and sends it to the MFD for processing. The MFD then processes the job (block 224).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
   a multifunction device comprising:
   (i) an input device for receiving constraint data that identifies a group of multifunction features available on the multifunction device for at least two client devices in a plurality of client devices coupled to the multifunction device; and
   (ii) a memory for storing the constraint data in association with at least one client device, a first set of constraint data stored in the memory of the multifunction device that corresponds to a first client device in the plurality of client devices, and a second set of constraint data stored in the memory of the multifunction device that corresponds to a second client device in the plurality of client devices, the second set of constraint data identifying a group of multifunction devices features different from a group of multifunction device features identified by the first set of constraint data; and
   a first client device having a multifunction device driver, the multifunction device driver of the first client device being configured to generate a print job for the multifunction device in accordance with the first set of constraint data received from the multifunction device; and
   a second client device having a multifunction device driver, the multifunction device driver of the second client device being configured to generate a print job for the multifunction device in accordance with the second set of constraint data received from the multifunction device.

2. The system of claim 1, wherein each client device includes a client device identifier and the first set of constraint data corresponding to the first client device are stored in the memory of the multifunction device in association with the first client device identifier and the second set of constraint data corresponding to the second client device are stored in the memory of the multifunction device in association with the second client device identifier.

3. The system of claim 1, the multifunction device driver further including:
   a user interface for displaying at each client device the programming options accessible to the client device in accordance with the set of constraint data received from the multifunction device.

4. The system of claim 3, the user interface further including:
   a feature selector for selecting a feature for a print job from the displayed programming options.

5. The system of claim 2, the client device identifier being a password key.

6. The system of claim 2, the client device identifier being an IP address.

7. The system of claim 2 further comprising:
   a system administration device selectively coupled to the multifunction device; and
   the input device of the multifunction device receiving constraint data in association with a client device identifier from the system administration device for storage in the multifunction device.

8. A method for a system comprising:
   receiving constraint data at a multifunction device, the constraint data identifying a group of multifunction features available on the multifunction device for at least two client devices in a plurality of client devices;
   storing a first set of constraint data that corresponds to a first client device in the plurality of client devices in the memory of the multifunction device;
   storing a second set of constraint data that corresponds to a second client device in the plurality of client devices in the memory of the multifunction device, the second set of constraint data identifying a group of multifunction device features different from a group of multifunction device features identified by the first set of constraint data;
   generating a first print job at the first client device in accordance with the first set of constraint data; and
   generating a second print job at the second client device in accordance with the second set of constraint data.

9. The method of claim 8, the constraint data reception at the multifunction device further comprises:
   inputting constraint data through a local user interface of the multifunction device.

10. The method of claim 8, the constraint data reception at the multifunction device further comprises:
    receiving constraint data from a system administration device selectively coupled to the multifunction device.

11. The method of claim 8, further comprising:
    associating the constraint data with a client device identifier for the client device.

12. The method of claim 10, the constraint data association further comprising:
    associating the constraint data with an IP address for the client device.

13. The method of claim 10, the constraint data association further comprising:
    associating the constraint data with a password key for the client device.

14. The method of claim 8, the print job generation at the first and the second client devices further comprises:
    displaying at the first client device the multifunction device features corresponding to the first set of constraint data; and
    displaying at the second client device the multifunction device features corresponding to the second set of constraint data.

15. A multifunction device for processing print jobs received from a plurality of client devices comprising:
    memory for storage of multiple sets of constraint data including a first set of constraint data stored in the memory of the multifunction device that corresponds to a first client device in the plurality of client devices and a second set of constraint data stored in the memory that corresponds to a second client device in the plurality of client devices, the second set of constraint data identifying a group of multifunction devices features different from a group of multifunction device features identified by the first set of constraint data so that the first and the second multifunction device drivers generate print jobs in accordance with the first and second sets of constraint data, respectively; and
    a print job processor for sending to a first client device in the plurality of client devices the first set of constraint data stored in association with the client device identifier corresponding to the first client device in response to a printer configuration request received from the first client device and for sending to a second client device in the plurality of client devices the second set of constraint data stored in association with the client device identifier corresponding to the second client device in response to a printer configuration request received from the second client device.

16. The multifunction device of claim 15 further comprising:
an input device for receiving a set of constraint data that identifies a subset of multifunction features available on the multifunction device.

17. The multifunction device of claim 16, the input device comprising:
a user interface for receiving a client device identifier and a set of constraint data to be associated with the client device identifier.

18. The multifunction device of claim 16, the input device comprising:

a communication interface for receiving constraint data messages from a system administration computer coupled to the multifunction device, the constraint data messages including a set of constraint data for a client device and a client device identifier to be associated with the set of constraint data.

* * * * *